(12) United States Patent
Van Brugge et al.

(10) Patent No.: US 8,129,437 B2
(45) Date of Patent: Mar. 6, 2012

(54) PROCESS FOR THE EXTRACTION OF HYDROGEN FROM A GAS MIXTURE

(75) Inventors: Paulus Theodorus Maria Van Brugge, Amsterdam (NL); Lisa Johanne Deprez, Amsterdam (NL); Arian Nijmeijer, Amsterdam (NL)

(73) Assignee: Shell Oil Company, Houston, TX (US)

( * ) Notice: Subject to any disclaimer, the term of this patent is extended or adjusted under 35 U.S.C. 154(b) by 381 days.

(21) Appl. No.: 12/446,013

(22) PCT Filed: Oct. 18, 2007

(86) PCT No.: PCT/EP2007/061140
§ 371 (c)(1), (2), (4) Date: Apr. 17, 2009

(87) PCT Pub. No.: WO2008/046880
PCT Pub. Date: Apr. 24, 2008

(65) Prior Publication Data
US 2010/0317751 A1 Dec. 16, 2010

(30) Foreign Application Priority Data
Oct. 19, 2006 (EP) .................................. 06122581

(51) Int. Cl.
*C07C 27/00* (2006.01)
*B01D 53/22* (2006.01)
*B01D 39/00* (2006.01)

(52) U.S. Cl. .................... 518/700; 95/50; 95/51; 95/55; 210/500.39

(58) Field of Classification Search ............... 95/50, 51, 95/55; 210/500.39; 518/700
See application file for complete search history.

(56) References Cited

U.S. PATENT DOCUMENTS

| 5,635,067 A | 6/1997 | Macheras | 210/500.23 |
| 2003/0223931 A1 | 12/2003 | Narayan | 423/651 |
| 2004/0147796 A1 | 7/2004 | Roman et al. | 585/820 |
| 2004/0159233 A1 | 8/2004 | Simmons et al. | 95/45 |
| 2006/0156920 A1 | 7/2006 | Ekiner et al. | 95/45 |

FOREIGN PATENT DOCUMENTS

| WO | WO0006293 | 2/2000 |
| WO | WO2006075203 | 7/2006 |

OTHER PUBLICATIONS

Of Bos et al., Suppression of gas separation membrane plasticization by homogeneous polymer blending, (AIChE Journal, vol. 47, No. 5 (May 2001), 1088-1093).*
Shishatskiy Sergey, et al.: Polyimide asymmetric membranes for hydrogen separation :Influence of formation conditions on gas transport properties, ADV. ENG. MATER.; Advanced Engineering Materials, May 2006, pp. 390-397.
Koros W J, et al: Elevated temperature application of polymer hollow-fiber membranes, Jrnl of Membrane Science, Elsevier Science, Amsterdam, NL, vol. 181, No. 2, Jan. 30, 2001, pp. 157-166.
Tanaka K., et al.: Gas Permeability and Permselectivity in Polyimides based on 3,3', 4,4'—Biphenyltetracarboxylic Dianhydride, Jrnl of Membrane Science, Elsevier Scientific Publ. Co., Amsterdam, NL vol. 47, No. ½, Nov. 1, 1989, pp. 203-215.
Database Compendex {online}, Engineering Information, Inc., N, Nakamura Asumaru et al: Aromatic Polyimide Membrane for Gas Separation and Its Applications XP002426700 & Nenryo Kyokai Shi, Dec. 1988, vol. 67, No. 12, Dec. 1988, pp. 1038-1051.

* cited by examiner

*Primary Examiner* — Jafar Parsa

(57) ABSTRACT

A process for the extraction of hydrogen from a gas mixture including hydrogen and carbon monoxide and optionally nitrogen, carbon dioxide, lower hydrocarbons and/or water, by contacting the gas mixture with a non-porous polyimide-based membrane, especially with the selective side of an asymmetric membrane, to obtain a hydrogen rich permeate and a hydrogen lean retenate, the polyimide-based membrane being a specific mixture of two polyimids. This specific membrane shows a very high hydrogen/carbon monoxide selectivity. The process is especially suitable for the upgrading of synthesis gas obtained by partial oxidation and/or reforming of hydrocarbonaceous feedstream for use in hydrocarbon synthesis reaction as the Fischer-Tropsch reaction.

15 Claims, No Drawings

PROCESS FOR THE EXTRACTION OF HYDROGEN FROM A GAS MIXTURE

PRIORITY CLAIM

The present application claims priority to European Patent Application 06122581.9 filed 19 Oct. 2006.

BACKGROUND OF THE INVENTION

The invention provides a process for the extraction of hydrogen from a gas mixture comprising at least hydrogen and carbon monoxide and optionally one or more other gasses, especially one or more of nitrogen, carbon dioxide, lower hydrocarbons and/or water, by contacting the gas mixture with a non-porous polyimide-based membrane, especially with the selective side of an asymmetric membrane, to obtain a hydrogen rich permeate and a hydrogen lean retentate. The invention especially concerns the use of specific blends of polyimides. Membranes made from these blends are especially suitable for the gas phase removal of hydrogen from a hydrogen and carbon monoxide containing gas mixture and show a particularly useful selectivity between hydrogen and carbon monoxide. The invention is especially suitable for the upgrading of synthesis gas obtained by partial oxidation and/or reforming of hydrocarbonaceous feedstream for use in synthesis gas conversion reactions as the Fischer-Tropsch reaction, methanol synthesis and dimethylether synthesis.

Polyimide membranes for gas phase separation are well known and are used in commercial applications such as the production of oxygen enriched air, the separation of carbon dioxide from methane and the separation of hydrogen from hydrocarbons. For certain gas streams one or more components may exhibit a strong interaction with the membrane material, which can plasticize the membrane. This holds especially for carbon dioxide. This may result in a detrimental decrease of the selectivity of the membrane.

At the present moment there is a strong interest in the production and use of synthesis gas obtained by partial oxidation and/or reforming of hydrocarbonaceous feedstocks as natural gas, biomass, heavy (residual) oil fractions and coal for the preparation of chemical compounds as methanol, dimethylether, ammonia, and, especially, paraffinic compounds, these paraffins especially suitable for use for the preparation of specialty normal and iso-paraffin mixtures and transportation fuels. The latter reaction, i.e. the synthesis of hydrocarbons, is well known in the art as the Fischer-Tropsch reaction. In general, synthesis gas is a mixture comprising mainly hydrogen and carbon monoxide. However, depending on the preparation process, it may contain considerable amounts of nitrogen, even up till 80 vol % of the total mixture, and carbon dioxide, even up till 40 vol % of the total mixture, usually up till 15 vol %. Further, several other components may be present as (unconverted) methane, water and one or more sulphur containing compounds.

A particular problem with the synthesis gas stream for use in especially the Fischer-Tropsch reaction is the $H_2/CO$ ratio. Depending on the gasification process and the starting hydrocarbonaceous feedstock synthesis gas with a specific $H_2/CO$ ratio is obtained. This $H_2/CO$ ratio is usually not the optimum ratio for the Fischer-Tropsch process. The Fischer-Tropsch process requires a specific overall $H_2/CO$ ratio (the so-called users ratio, usually 2.0 till 2.1), which requires specific measures to obtain this ratio. These measures could be: subjecting (part of) the syngas to a water-gas shift reaction; the combination of partial oxidation and steam reforming; additional production of hydrogen; import of hydrogen from a different source; the use of part of the CO for energy generation; etc. It is, in addition, also possible to adapt the $H_2/CO$ ratio by membrane separation of the synthesis gas in order to remove part of the hydrogen or part of the carbon monoxide. Such a process requires a highly selective and productive membrane. In the case of other syngas based synthesis reactions, similar problems as described above will apply.

Several processes are known to separate hydrogen from syngas. Cryogenic processes, for instance, are well known. However, such processes require high amounts of energy in order to create the low temperatures.

In US 2003/0223931 is disclosed a method for forming synthesis gas with a tailored hydrogen/carbon monoxide ratio, wherein the synthesis gas is subjected to a membrane separation process using a polyimide membrane. In Shishatskiy et al. "Polyimide Asymmetric Membranes for Hydrogen Separation Influence of Formation" Advanced Engineering materials, vol. 8 (2006), 390-397, the use of dense membranes of a specific polyimide (Matrimid 5218, a polyimide of 3,3',4,4'-benzophenone tetracarboxylic dianhydride and diamino-phenylindane) for gas separations is described.

SUMMARY OF THE INVENTION

It has now been found that the use of a specific mixture of two polyimides as membrane results in a highly selective and productive separation of hydrogen from a mixture comprising at least hydrogen and carbon monoxide and optionally one or more other gasses, especially one or more of nitrogen, carbon dioxide, lower hydrocarbons and/or water. A remarkably high hydrogen/carbon monoxide selectivity is obtained when compared with membranes from the starting polyimides only.

Thus, the present application concerns a process for the extraction of hydrogen from a gas mixture comprising hydrogen and carbon monoxide and optionally nitrogen, carbon dioxide, lower hydrocarbons and/or water, by contacting the gas mixture with a non-porous polyimide-based membrane, especially with the selective side of an asymmetric membrane, to obtain a hydrogen rich permeate and a hydrogen lean retentate, the membrane being a blend of BTDA-DAPI and BTDA-TDI/MDI.

Such membranes are known to be suitable for air separation processes, i.e. the separation of oxygen from air. Reference is made to U.S. Pat. No. 5,635,067 in this respect.

DETAILED DESCRIPTION OF THE INVENTION

The process according to the invention results in a highly selective separation of the hydrogen from the hydrogen/carbon monoxide mixture. In addition, a high productivity is obtained. Further, nitrogen present in the mixture will essentially not pass through the membrane, i.e. the amount of nitrogen which passes the membrane is less than 10 mol % of the amount of hydrogen which passes through the membrane, especially less than 5 mol %. Another advantage is the fact that carbon dioxide, when present, generates only little plasticization in the membrane while the membrane will retain almost all of the carbon monoxide in the retentate. A further advantage of the specific membranes used in the present invention, is that the presence of water surprisingly increases the selectivity of the membrane while maintaining the productivity. In addition, most of the water, or at least a substantial amount, i.e. more than 40 mol % of the total water content, especially more than 60 mol %, will be removed from the feed synthesis gas, which is especially advantageous in the case of synthesis gas for use in e.g. methanol synthesis or in the Fischer-Tropsch reaction, as most of the catalysts, especially any cobalt based Fischer-Tropsch catalysts, show more deactivation at higher water partial pressures.

The amount of hydrogen and carbon monoxide in the gas mixture may vary over a wide range. The total amount of these two components is usually at least 5 vol % based on the total volume of gas mixture, more usually at least 10 vol %. Suitably the total amount is between 20 and 100 vol % (based on the total volume of gas mixture), preferably between 40 and 98 vol %, more preferably between 60 and 95 vol %.

The hydrogen/carbon monoxide molar ratio may vary over a wide range, e.g. between 0.1 and 50, and is suitably between 0.3 and 10, preferably between 0.4 and 8, more preferably between 0.5 and 5.

The gas mixture may contain a certain amount of carbon dioxide. Usually the amount will be less than 40 vol % based on the total volume of gas mixture, especially less than 25 vol %. Suitably the amount of carbon dioxide present in the gas mixture is between 0 and 15 vol % based on the total volume of gas mixture, preferably between 0.5 and 10 vol %, more preferably between 1 and 5 vol %.

The amount of lower hydrocarbons in the gas mixture is usually less than 40 vol % of the total gas mixture, suitably up till 10 vol % (based on the total volume of gas mixture), preferably between 0.5 and 5 vol %, more preferably between 0.1 and 2 vol %. Reference herein to lower hydrocarbons is to $C_1$ till $C_4$ hydrocarbons. A large part of the lower hydrocarbons is usually methane, usually up till 80 vol % of the lower hydrocarbon fraction, suitably up till 50 vol %.

The amount of nitrogen is suitably up till 80 vol % (based on the total volume of gas mixture), preferably up till 65 vol %, more preferably up till 50 vol %, especially between 0.5 and 20 vol %, more especially between 1 and 10 vol %. Nitrogen may be present in the case that air or enriched air is used in the partial oxidation step, or could have been present in, especially, the natural gas or could have been used as transportation gas in coal liquefaction.

The amount of water is usually relatively low. In most cases it will be less than 5 vol % of the gas mixture as at the temperature at which the process is carried out the saturation is in this order. Suitably the amount of water is up till 2 vol %, preferably between 0.1 and 1 vol %, more preferably between 0.2 and 0.5 vol %. An optimum amount of water is between 0.05 and 1.5 vol %, especially between 0.2 and 1.2 vol %, as at these levels a relatively high $H_2$/CO selectivity is obtained.

The process of the present invention may be carried out at any suitable temperature, e.g. from 0° C. up till 150° C. Suitably the temperature is between 10 and 120° C., preferably between 30 and 100° C.

The process of the present invention may be carried out at any suitable pressure difference over the membrane, e.g. between 1 bar and 200 bar. Suitably the pressure difference is between 2 and 100 bar, preferably between 3 and 50 bar, more preferably between 5 and 25 bar.

The pressure at the permeate site of the membrane is usually between 0.01 and 50 bar (absolute), suitably between 0.1 and 20 bar (absolute), preferably between 0.5 and 10 bar (absolute), more preferably between 1 and 4 bar (absolute).

The pressure of the gas mixture is suitably between 1.01 and 250 bar (absolute), especially between 2.1 and 120 bar (absolute), preferably between 3.5 and 60 bar (absolute), more preferably between 5.5 and 29 bar (absolute).

The gas mixture to be used in the present invention may be any gas mixture comprising hydrogen and carbon monoxide, but is especially synthesis gas. However, any refinery stream or gas stream in a chemical or petrochemical plant containing hydrogen and carbon monoxide may be used. In particular, the gas mixture is synthesis gas obtained by partial oxidation and/or reforming of a hydrocarbonaceous feedstock, preferably the synthesis gas has been subjected to a water-gas shift reaction to increase the amount of hydrogen and to decrease the amount of carbon monoxide, the water-gas shift reaction preferably comprising a hot and a cold water-gas shift reaction in series. Sweet as well as sour shift may be used, depending on the starting gas mixture. In a further preferred embodiment the synthesis gas is synthesis gas from which compounds other than hydrogen, carbon monoxide, water, nitrogen and carbon dioxide have been removed, preferably synthesis gas from which sulphur and/or nitrogen compounds, especially hydrogen sulphide, carbonyl sulphide, ammonia, hydrogen cyanide, and carbon dioxide have been removed. The hydrocarbonaceous feedstock for the preparation of the synthesis may be natural gas, associated gas, coal bed methane, ethane, LPG, naphtha, biomass, e.g. wood shavings, straw, municipal waste, manure etc., heavy and/or residual oil fractions, peat, brown coal and/or coal, and mixtures thereof. Any partial oxidation process may be used, catalytic or non-catalytic may be used, especially non-catalytic.

The first polymer of the blend according to the present invention, BTDA-DAPI, is a polyimide copolymer based on 3,3',4,4'-benzophenone tetracarboxylic dianhydride and diamino-phenylindane. It has the following chemical structure:

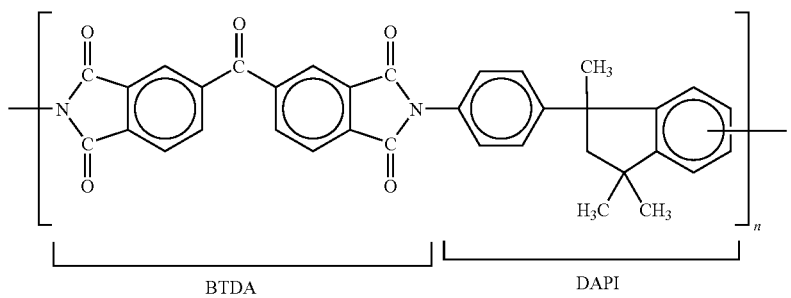

and is commercially available from Ciba-Geigy under the name Matrimid 5218 (trade name).

The second polymer, BTDA-TDI/MDI, of the blend according to the present invention is a polyimide copolymer derived from reacting 3,3',4,4'-benzophenone tetracarboxylic dianhydride with a mixture of toluene di-isocyanate (TDI) and 4,4'-methylene-bis(phenylisocyanate) (MDI). Such a compound is commercially available from HP Polymers Inc, Lewisville, Tex./Lenzing under the name P84 (trade name). In P84, approximately 80% of the 3,3',4,4'-benzophenone tetracarboxylic dianhydride has reacted with toluene di-isocyanate and approximately 20% with 4,4'-methylene-bis(phenylisocyanate). It has the following chemical structure:

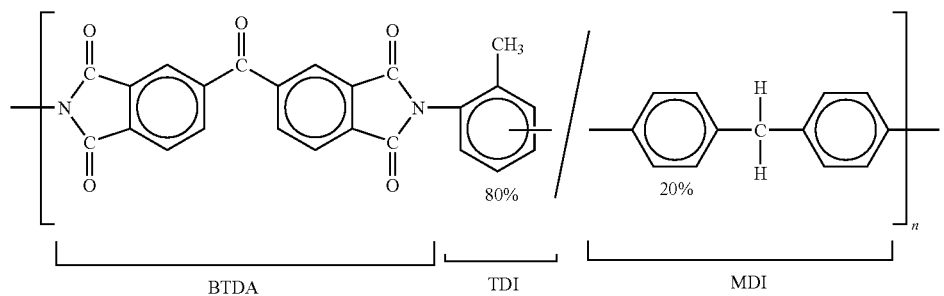

BTDA    TDI    MDI

The membrane in the process of the present invention may be prepared from any mixture of BTDA-DAPI and BTDA-TDI/MDI. Suitably the amount BTDA-DAPI is between 20 and 80 wt % of the membrane and the amount of BTDA-TDI/MDI is between 80 and 20 wt % of the membrane, preferably between 40 and 60 wt %, respectively between 60 and 40 wt %, more preferably 50 wt %, respectively 50 wt %. Suitably the membrane only comprises BTDA-DAPI and BTDA-TDI/MDI. The membrane may contain up till 10 wt % of surfactants based on total membrane weight, especially 5 wt %.

The membrane to be used in the present invention is suitably in the form of an elongated tube. The diameter of the tube is suitably between 0.5 and 10 mm, especially between 1 and 5 mm. The length may be anything between 1 cm and 10 meters or even more, suitably between 10 cm and 2 m. These tubular membranes may be prepared by dry/wet spinning techniques (see e.g. Kapantaidakis, Koops and Wessling, Desalination 145 (2002), 353-357. It is also possible to use flat sheet or film membranes, e.g. square or rectangular membranes (using known techniques, e.g. by casting on glass plates). Preferably spirally wound membranes may be used. Preferably a multitude of tubular membranes is used in one unit. This multitude of membranes is especially coaxially arranged. In this arrangement the gas mixture flows around the membrane tubes, and the hydrogen rich mixture is collected within the membrane tube, and preferably collected in a common collecting device. Alternatively, the feed may flow through the inner side of the tubes and the permeate is collected at the outside.

As indicated above, the membrane to be used in the present invention can be made by any suitable method for the preparation of membranes. A suitable process is described in Bos, Pünt, Strathmann and Wessling, AIChE Journal, May 2001, Vol. 47, No. 5, 1088-1093, Visser, Koops and Wessling, J. of Membrane Science 252 (2005), 265-277 and Bos, Pünt, Wessling and Strathmann, J. of Membrane Science 155, (1999) 67-78. See further also US 2004/0159233, US 2006/0156920, US 2004/0147796, WO 00/06293 and WO 2006/075203. If required, e.g. when small holes would be present in the membranes, the membrane may be coated with a suitable polymer, e.g. a silicon rubber coating.

In the process according to the invention the hydrogen rich permeate usually contains more than 50 vol % of hydrogen, suitably between 70 an 98 mol % of hydrogen, preferably between 85 and 96 mol %. The hydrogen lean retentate will usually contain less than 50 vol % of hydrogen based on the full stream, and suitably contains between 1 and 40 mol % of hydrogen, more suitably between 2 and 15 vol %.

In the process according to the invention the water is removed from the hydrogen rich permeate by cooling the gas below the dew point of the water, followed by removal of the condensed water. Removal of the water can be done by a simple knock out vessel.

If desired, the hydrogen rich permeate obtained according to the processes described above, may be further purified by methods known in the art, especially by pressure swing adsorption.

A very suitable use of the process of the of the present invention is in the synthesis of hydrocarbons according to the Fischer-Tropsch synthesis. In this process synthesis gas is contacted with a suitable catalyst, preferably a cobalt based Fischer-Tropsch catalyst, and converted into a mixture of mainly paraffinic hydrocarbons. Thus, the present invention also relates to a process for the preparation of hydrocarbons from synthesis gas by means of a hydrocarbon synthesis reaction, the synthesis gas being made by partial oxidation of a hydrocarbonaceous feedstock, the synthesis gas having an $H_2/CO$ ratio below the consumption ratio of the hydrocarbon synthesis reaction, in which hydrogen is extracted from the synthesis gas by the extraction of hydrogen from a gas mixture comprising hydrogen and carbon monoxide and optionally nitrogen, carbon dioxide, lower hydrocarbons and/or water, by contacting the gas mixture with a non-porous polyimide-based membrane, especially with the selective side of an asymmetric membrane, to obtain a hydrogen rich permeate and a hydrogen lean retentate, the membrane being a blend of BTDA-DAPI and BTDA-TDI/MDI, and using a part of the hydrogen lean retentate (especially 20 to 80 vol % of the total stream) and hydrogen rich permeate in the hydrocarbon synthesis reaction. Preferably all the hydrogen rich permeate is used and part, e.g. 20-80 vol % of the hydrogen lean retentate is used. In an alternative way, the syngas is split into two fractions, e.g. a first fraction containing between 20 and 80 vol % of the syngas, the second fraction the remainder, hydrogen is extracted from one fraction and combined with the second fraction. In addition, the present invention also concerns a process for the preparation of hydrocarbons from synthesis gas by means of a hydrocarbon synthesis reaction, the synthesis gas being made by reforming of a hydrocarbonaceous feedstock optionally in combination with partial oxidation, the synthesis gas preferably having an $H_2/CO$ ratio above the consumption ratio of the hydrocarbons reaction, in which hydrogen is extracted from the synthesis gas by the extraction of hydrogen from a gas mixture comprising hydrogen and carbon monoxide and optionally nitrogen, carbon dioxide, lower hydrocarbons and/or water, by contacting the gas mixture with a non-porous polyimide-based membrane, especially with the selective side of an asymmetric membrane, to obtain a hydrogen rich permeate and a hydrogen lean retentate, the membrane being a blend of BTDA-DAPI and BTDA-TDI/MDI, and using the hydrogen lean retentate (especially 20 to 80 vol % of the total stream) in the hydrocarbon synthesis reaction.

In the above described Fischer-Tropsch processes all preferred embodiments apply as discussed before.

Products of the Fischer-Tropsch synthesis may range from methane to heavy paraffinic waxes. Preferably, the production of methane is minimised and a substantial portion of the hydrocarbons produced have a carbon chain length of a least 5 carbon atoms. Preferably, the amount of $C_5+$ hydrocarbons is at least 60% by weight of the total product, more preferably, at least 70% by weight, even more preferably, at least 80% by weight, most preferably at least 85% by weight. Reaction products which are liquid phase under reaction conditions may be physically separated. Gas phase products such as light hydrocarbons and water may be removed using suitable means known to the person skilled in the art.

Fischer-Tropsch catalysts are known in the art, and typically include a Group VIII metal component, preferably cobalt, iron and/or ruthenium, more preferably cobalt. Typically, the catalysts comprise a catalyst carrier. The catalyst carrier is preferably porous, such as a porous inorganic refractory oxide, more preferably alumina, silica, titania, zirconia or mixtures thereof.

The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese, scandium and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

Reference to "Groups" and the "Periodic Table" as used herein relate to the "previous IUPAC form" of the Periodic Table such as that described in the 68th edition of the Handbook of Chemistry and Physics (CPC Press).

A most suitable catalyst comprises cobalt as the active metal and zirconium as a promoter. Another most suitable catalyst comprises cobalt as the catalytically active metal and manganese and/or vanadium as a promoter.

The promoter, if present in the catalyst, is typically present in an amount of from 0.1 to 60 parts by weight per 100 parts by weight of carrier material.

The Fischer-Tropsch synthesis is preferably carried out at a temperature in the range from 125 to 350° C., more preferably 175 to 275° C., most preferably 200 to 260° C. The pressure preferably ranges from 5 to 150 bar (absolute), more preferably from 5 to 80 bar (absolute).

EXAMPLES

The invention is now further illustrated by means of the following non-limiting examples.

Example 1

Comparison

Experiment 1

The permeance of a pure BTDA-DAPI membrane (matrimid 5218 ex Ciba Geigy) for nitrogen was measured in a single gas experiment at 35° C. and a trans-membrane pressure difference of 4 bar.

Experiment 2

The permeance of the same pure BTDA-DAPI membrane for hydrogen was measured in a single gas experiment at 35° C. and a trans-membrane pressure difference of 10 bar.

Experiment 3

The selectivity for hydrogen of the same pure BTDA-DAPI membrane was measured by contacting a $H_2/CO$ mixture (molar ratio 4:1) with the membrane at a temperature of 35° C. and a trans-membrane pressure difference of 4 bar.

Experiment 4

The selectivity for hydrogen of the same pure BTDA-DAPI membrane was measured by contacting a $H_2/CO$ mixture (molar ratio 4:1) containing 0.50 wt % $H_2O$ with the membrane at a temperature of 50° C. and a trans-membrane pressure difference of 10 bar.

Example 2

According to the Invention

As experiments 1 to 4 of EXAMPLE 1, but now with a membrane that is a blend of 50 wt % BTDA-DAPI and 50 wt % BTDA-TDI/MDI (matrimid 5218/P84).

The permeance for hydrogen and the hydrogen selectivity in the absence and the presence of $H_2O$ for both membranes as measured in EXAMPLES 1 and 2 is shown in the Table. Selectivity is defined as the ratio between fraction of $H_2$/fraction of CO in the permeate and fraction of $H_2$/fraction of CO in the retentate. Neither the matrimid 5218 nor the matrimid 5218/P84 membrane showed a measurable permeance with respect to nitrogen.

TABLE $H_2$ permeance and $H_2$ selectivity for EXAMPLES 1 and 2

| | EXAMPLE 1 Matrimid 5218 | | EXAMPLE 2 Matrimid 5218/P84 | |
| --- | --- | --- | --- | --- |
| feed gas | $H_2$ permeance (mole $H_2/m^2sPa$) | $H_2$ selectivity | $H_2$ permeance (mole $H_2/m^2sPa$) | $H_2$ selectivity |
| $H_2$ only | 1.20E−08 | n.a.* | 3.29E−08 | n.a.* |
| $H_2$/CO 4:1 | 1.10E−08 | 35.0 | 2.95E−08 | 46.6 |
| $H_2$/CO 4:1 0.50 wt % $H_2O$ | 0.98E−08 | 27.0 | 2.60E−08 | 69.8 |

*n.a.: not applicable

What is claimed is:

1. A process for the extraction of hydrogen from a gas mixture comprising hydrogen and carbon monoxide and optionally nitrogen, carbon dioxide, lower hydrocarbons and/or water, by contacting the gas mixture with a non-porous polyimide-based membrane, to obtain a hydrogen rich permeate and a hydrogen lean retentate, the membrane being a blend of BTDA-DAPI and BTDA-TDI/MDI.

2. A process according to claim 1, in which the amount of BTDA-DAPI is between 20 and 80 wt % of the membrane and the amount of BTDA-TDI/MDI is between 80 and 20 wt % of the membrane.

3. A process according to claim 1 in which the total amount of hydrogen and carbon monoxide in the gas mixture is between 20 and 100 vol % (based on the total volume of gas mixture).

4. A process according to claim 1, in which the hydrogen/carbon monoxide molar ratio is between 0.3 and 10.

5. A process according to claim 1, in which also carbon dioxide is present in the gas mixture in an amount of between 0 and 20 vol % (based on the total volume of gas mixture).

6. A process according to claim 1, in which the amount of water is up till 2 vol %.

7. A process according to claim 1, in which the extraction is carried out at a temperature between 10 and 120° C.

8. A process according to claim 1, in which the extraction is carried out with a pressure difference over the membrane of between 2 and 100 bar.

9. A process according to claim 1, in which the pressure of the permeate is between 0.1 and 20 bar (absolute).

10. A process according to claim 1, in which the pressure of the gas mixture is between 2.1 and 120 bar (absolute).

11. A process according to claim 1, in which the gas mixture is synthesis gas obtained by partial oxidation and/or reforming of a hydrocarbonaceous feedstock, the synthesis gas being subjected to a water-gas shift reaction to increase the amount of hydrogen and to decrease the amount of carbon monoxide, the water-gas shift reaction comprising a hot and a cold water-gas shift reaction.

12. A process according to claim 1, in which the synthesis gas is synthesis gas from which compounds other than hydrogen, carbon monoxide, water, nitrogen and carbon dioxide have been removed.

13. A process according to claim 1, in which the hydrogen rich permeate is further purified by pressure swing adsorption.

14. A process for the preparation of hydrocarbons from synthesis gas by means of a hydrocarbon synthesis reaction, the synthesis gas being made by partial oxidation of a hydrocarbonaceous feedstock, the synthesis gas having an $H_2/CO$ ratio below the consumption ratio of the hydrocarbon synthesis reaction, in which hydrogen is extracted from the synthesis gas by the extraction of hydrogen from a gas mixture comprising hydrogen and carbon monoxide and optionally nitrogen, carbon dioxide, lower hydrocarbons and/or water, by contacting the gas mixture with a non-porous polyimide-based membrane, to obtain a hydrogen rich permeate and a hydrogen lean retentate, the membrane being a blend of BTDA-DAPI and BTDA-TDI/MDI, and using a part of the hydrogen lean retentate, and hydrogen rich permeate in the hydrocarbon synthesis reaction.

15. A process for the preparation of hydrocarbons from synthesis gas by means of a hydrocarbon synthesis reaction, the synthesis gas being made by reforming of a hydrocarbonaceous feedstock in combination with partial oxidation, the synthesis gas having an H2/CO ratio above the consumption ratio of the hydrocarbon synthesis reaction, in which hydrogen is extracted from the synthesis gas by the extraction of hydrogen from a gas mixture comprising hydrogen and carbon monoxide and optionally nitrogen, carbon dioxide, lower hydrocarbons and/or water, by contacting the gas mixture with a non-porous polyimide-based membrane, to obtain a hydrogen rich permeate and a hydrogen lean retentate, the membrane being a blend of BTDA-DAPI and BTDA-TDI/MDI, and using the hydrogen lean retentate in the hydrocarbon synthesis reaction.

* * * * *